April 29, 1969           E. I. ONSTOTT           3,441,488
ELECTROLYTIC DESALINATION OF SALINE WATER
BY A DIFFERENTIAL REDOX METHOD
Filed Sept. 3, 1964
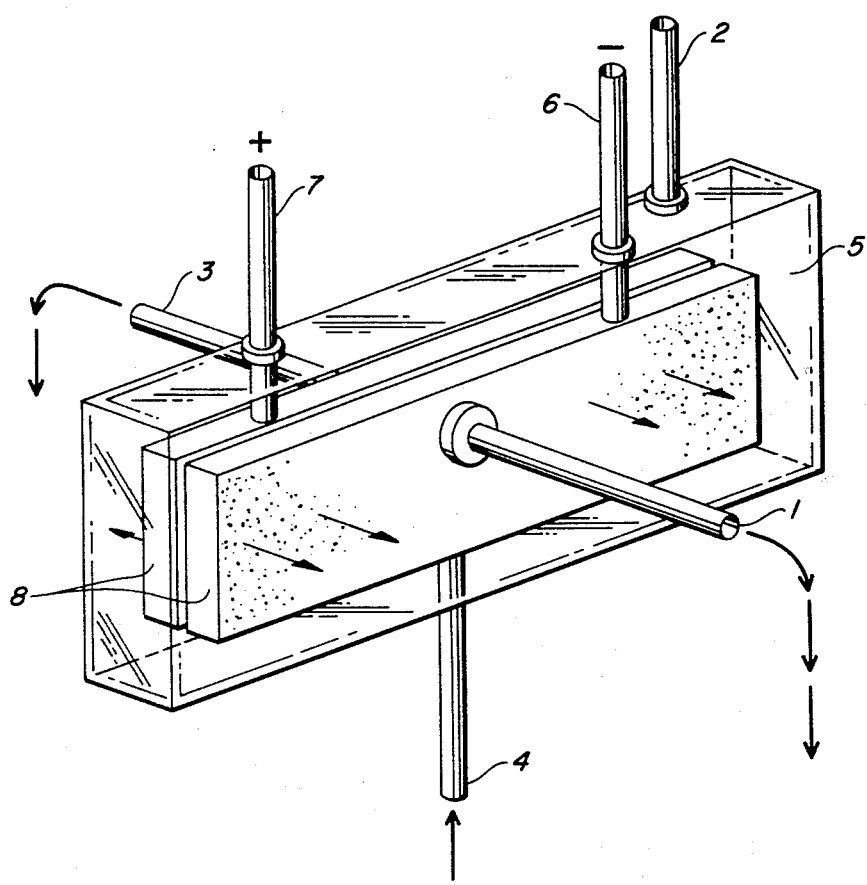
INVENTOR.
Edward I. Onstott United States Patent Office 3,441,488
Patented Apr. 29, 1969

3,441,488
ELECTROLYTIC DESALINATION OF SA-
LINE WATER BY A DIFFERENTIAL RE-
DOX METHOD
Edward I. Onstott, Los Alamos, N. Mex., assignor to the United States of America as represented by the United States Atomic Energy Commission
Filed Sept. 3, 1964, Ser. No. 394,370
Int. Cl. C02b 1/82
U.S. Cl. 204—149   3 Claims

ABSTRACT OF THE DISCLOSURE

A method and device for desalination of saline water by a differential reduction-oxidation electrolysis in which closely positioned porous electrodes are connected to a power supply, a feed inlet tube positioned in the bottom of the cell, and outlet tubes positioned adjacent to each of the electrodes and a small amount of a halide being added to the feed before the electrolysis begins.

---

This invention relates to a method and device or the desalination of saline water and, in particular, to a method which utilizes the principle of electrochemical mass transport as the means to accomplish the desalination.

Electrolysis of saline water to reduce salt content has been a project of some interest to modern civilization. However, methods utilizing the electrolysis process have all suffered from a prohibitive energy consumption and, therefore, are impractical due to this economic limitation. The main purpose of this invention is to describe a desalination of electrolytes by a new electrochemical mass transport method which utilizes much lower electrical energy requirements than the general class of electrolytic processes. In this invention water containing sodium chloride and/or sodium bromide and a specific amount of dissolved chlorine or bromine is electrolyzed between closely spaced parallel porous carbon electrodes with the saline water flowing through the pores of the electrodes to separate the electrolysis products. No membrane or barrier between the electrodes is used. At the anode, halide is oxidized to halogen and a halide depletion region is established, while at the cathode, dissolved halogen is reduced to halide, thus producing an enrichment region. As a result of the halide ion concentration gradient created by electrolysis, sodium ion migrates from the anode region to the cathode region. Desalination takes place in the flowing anolyte stream and salt enrichment occurs in the flowing catholyte stream. The electrolysis is driven unidirectionally in steady-state, since no phase change in the heterogeneous electrode reactions is effected. The electrical energy requirements are low and near reversible behavior is possible with the bromine-sodium bromide electrolytes.

It is therefore an object of this invention to provide a method and a device for the desalination of saline water.

It is another object of the present invention to provide an electrolytic differential redox process which can be accomplished under ambient temperature conditions.

It is a further object of the present invention to provide a process where phase transfer of the electrolyte salt is not required, but instead a cyclic phase transfer of the gaseous neutral anion reactant is used.

It is yet another object of the present invention to provide an energy transfer agent which can be easily purged from the anolyte solutions so as to be recycled into the saline stream.

It is still another object of the present invention to provide high desalination rates with high salt concentrations without an energy penalty or need for exceedingly large electrodes.

Numerous other advantages and possible objects of the invention will become evident from the following description of a single preferred embodiment of the invention chosen for illustration and depicted in the accompanying drawing wherein:

The figure is a plan view of the cell used in the present invention.

The figure shows electrodes 8 which are made of porous carbon that has a high porosity and high electrical conductivity. The size of the electrodes is approximately 5 x 20 x 1 centimeters and the spacing between said electrodes is approximately 3 millimeters. Electrical connections 6 and 7 are press-fitted to each electrode. These electrical connections are made of a .64 centimeter diameter graphite rod. Polyethylene inlet 4 and outlet tubes 1 and 3 are attached to the cell 5 with an epoxy resin. The spacing between the backside of each electrode and the exterior wall 5 is about 2 millimeters. Attached to the top of the cell is a gas vent 2 that prevents the buildup of gas blocks between the electrode faces.

An embodiment of the present invention is described as follows: After adjusting the desired current with a manually operated variable voltage transformer, the flow rates of the anolyte through outlet 3 and the catholyte through oulet tube 1 are adjusted. The cell (see the figure) is operated with the feed 4 counter to the force of gravity and flow rates are controlled at the outlet tubes 1 and 3 and with a pinch clamp (not shown) on a short length of polyethylene tubing. The saline water feed level is controlled manually or by a pump (not shown) so that said level is about 40 centimeters higher than the inlet level. The saline water feed consists of sodium chloride and chlorine, the chlorine being added in either aqueous or gaseous state in a concentration of about 0.06 molar and the sodium chloride being present in a concentration of 0.05 molar. The cell operating conditions are as follows: current, 8.3 milliamperes; voltage, 56 millivolts; flow rate, anolyte, 2.11 milliliters per minute, catholyte, 2.02 milliliters per minute; feed salt content, 2940 parts per million, anolyte, 2910 parts per million, catholyte, 2962 parts per million; electrolysis time, 220 minutes.

A cathodic depolarizer which acts as an oxidant is added to the electrolyte to lower the driving voltage and thus diminish the energy requirement. The inventor has found that dissolved chlorine or bromine do quite well as oxidants or as energy transfer agents. Other oxidants such as oxygen, hydrogen peroxide and the nitrogen oxides should work as energy transfer agents at one or both electrodes, but the preferred oxidant of this invention is bromine. The main criteria for the oxidant is that it has multiple oxidation states and thus provides a method of unidirectional steady-state heterogeneous desalination without phase transfer and ideally with no net consumption of the oxidant.

Successful execution of the reduction method described in this invention depends on three critical requirements. These are:

(1) Providing two separated, but closely positioned inert surfaces, for transfer of the electrical energy to the electrolyte reactants.

(2) A method of separating the anode and cathode reaction products.

(3) A soluble energy transfer agent capable of existing in at least two oxidation states.

Operating conditions and data on electrolysis with water containing chlorine-sodium chloride and water containing bromine-sodium chloride and sodium bromide are given in the following Tables 1, 2 and 3 with the experiment numbers being related throughout these tables.

TABLE 1.—POROUS CARBON CELL OPERATING CONDITIONS

| Experiment No. | Saline water feed, molarity | Current, milliamps | Driving voltage, millivolts | Flow rate, ml./min. Anolyte | Flow rate, ml./min. Catholyte |
|---|---|---|---|---|---|
| 1 | 0.062 $Cl_2$, 0.05 NaCl | 8.3 | 56 | 2.11 | 2.02 |
| 2 | 0.062 $Cl_2$, 0.050 NaCl | 270 | 540 | [1] 4.85 | 4.96 |
| 3 | 0.013 $Br_2$, 0.050 NaBr | 13.9 | 27.5 | 2.08 | 2.00 |
| 4 | 0.013 $Br_2$, 0.050 NaBr | 270 | 291 | 41.0 | 42.4 |
| 5 | 0.061 $Br_2$, 0.067 NaCl | 118 | 226 | 5.97 | 5.45 |
| 6 | 0.061 $Br_2$, 0.067 NaCl | 135 | 186 | 20.3 | 13.8 |
| 7 | 0.032 $Br_2$, 0.050 NaCl | 88 | 190 | 10.9 | 9.44 |
| 8 | 0.032 $Br_2$, 0.050 NaCl | 113 | 185 | 22.8 | 23.1 |
| 9 | 0.0079 $Br_2$, 0.050 NaCl | 86 | 247 | 9.60 | 10.1 |
| 10 | 0.0079 $Br_2$, 0.050 NaCl | 88 | 188 | 38.9 | 35.9 |

[1] Cell vented intermittently to remove gas formed at anode.

TABLE 2.—POROUS CARBON CELL DESALINATION AND FARADAY EFFICIENCY DATA

| No. | Salt content, p.p.m. Feed | Salt content, p.p.m. Anolyte | Salt content, p.p.m. Catholyte | Depletion ratio [1] | Faraday efficiency, percent Anode | Faraday efficiency, percent Cathode | Salt depletion in anolyte, mg. |
|---|---|---|---|---|---|---|---|
| 1 | 2,940 | 2,910 | 2,962 | .982 | 13 | 21 | 8.9 |
| 2 | 2,951 | 2,672 | 3,260 | .820 | 14 | 16 | 148.7 |
| 3 | 5,111 | 4,920 | 5,259 | .936 | 35 | 33 | 75.1 |
| 4 | 5,071 | 4,912 | 5,242 | .937 | 38 | 43 | 143.6 |
| 5 | 3,902 | 3,668 | 4,189 | .876 | 33 | 36 | 112.0 |
| 6 | 3,902 | 3,822 | 4,097 | .933 | 33 | 50 | 40.5 |
| 7 | 2,946 | 2,835 | 3,064 | .925 | 38 | 35 | 60.4 |
| 8 | 2,946 | 2,878 | 3,012 | .956 | 38 | 37 | 31.0 |
| 9 | 2,945 | 2,813 | 3,068 | .917 | 41 | 40 | 63.3 |
| 10 | 2,945 | 2,915 | 2,979 | .979 | 37 | 38 | 23.3 |

[1] Anolyte/catholyte salt ratio.

TABLE 3.—POROUS CARBON CELL DESALINATION RAT AND ENERGY DATA

| No. | Electrolysis time, minutes | Desalination rate, millimoles/hour | Joules/millimole Experimental electrical work | Joules/millimole Computed reversible work | Joules/millimole Irreversible electrical work |
|---|---|---|---|---|---|
| 1 | 220 | 0.042 | 40 | 5.05 | 35 |
| 2 | 110 | 1.39 | 387 | 5.95 | 381 |
| 3 | 240 | 0.18 | 7.5 | 5.29 | 2.2 |
| 4 | 22 | 3.80 | 74 | 5.28 | 69 |
| 5 | 80 | 1.44 | 67 | 5.52 | 61 |
| 6 | 25 | 1.66 | 54 | 5.30 | 49 |
| 7 | 50 | 1.24 | 48 | 5.35 | 43 |
| 8 | 20 | 1.59 | 47 | 5.19 | 44 |
| 9 | 50 | 1.30 | 59 | 5.39 | 52 |
| 10 | 20 | 1.20 | 50 | 5.07 | 45 |

An examination of Tables 1 and 2 shows that the bromine and chlorine-sodium halide systems have anode reactions in which the bromide or chloride ion is oxidized to bromine or chlorine while the cathode reaction reduces the bromine and chlorine to the bromide and chloride ion, respectively. The current through the cell is a result of the rate of charge transfer at the electrodes. Tables 1 and 2 also show that the rate of charge transfer is directly proportional to the driving voltage and that the sodium halide concentration has a large effect on the charge transfer reaction. Thus the resistance to the driving voltage is related to the movement of ions in the electrolytes. Table 3 shows the energy values of Experiments 1 through 10. As noted in Table 3, the same Faraday efficiency prevailing in Experiments 7, 9, and 10 would lead one to expect the same desalination rate. Experiments 7 and 9, however, have a factor of 4 difference in the bromine concentration and have similar flow rates. This difference in bromine concentration is compensated by applying a higher voltage to the lower concentration (Exp. 9). Experiments 7 and 10 indicate the effect caused by the bromine concentration can be compensated by increasing the flow rate by a factor of 4 and still maintain the same energy requirements in both experiments (7 and 9, 7 and 10). Table 3 further compares the electrical energy of the redox method and device of this invention versus the minimum energy requirement as computed for the ideal thermodynamic process.

There has been described above a novel method and device for the desalination of saline water and a multitude of possible structural variations within the scope of the invention are possible. For example, the porosity of the carbon electrodes shown in the figure were about 50%; however, any electrode material that would allow the flow of the saline reactants through its structure and has a high electrical conductivity (a factor of 10 less than the resistance inherent in the electrolyte) would satisfy the requirements of this invention. Likewise, the size of the electrodes would be dependent on the application of the cell. The inventor has used carbon electrodes whose thickness has varied from 2 to 10 millimeters while the actual spacing between the electrodes has been varied between 2 to 10 millimeters with good results. Another variation of this invention, which would realize the full utility of the cell heretofore described, is the use of this cell in "cascade," that is, a number of like cells are connected in series so that progressively purer water would be obtained. A still further variation in the method of operating the cell of this invention is that feed flow need not be counter current; however, counter current flow does enhance the operation since gravity tends to stabilize the transfer of ions to and through their respective electrodes. Therefore the foregoing description is not intended to limit the present invention, but instead reference is made to the following claims for a precise definition of the invention.

What is claimed is:

1. An improved method of desalination of saline water by an electrochemical reduction process in which the improvement consists of adding a 0.06 to 0.008 molar solution of a halogen selected from the class consisting of chlorine and bromine to said saline water and causing said saline water with its halogen additive to flow between two oppositely charged porous electrodes operating at a current density that is proportional to the salt and halogen concentration in said water, the salt-enriched water flowing through the cathode and suitable outlet means and the salt-depleted water flowing through the anode and suitable outlet means.

2. The method of claim 1 in which the said halogen is chlorine.

3. The method of claim 1 in which the said halogen is bromine.

(References on following page)

References Cited

UNITED STATES PATENTS

| | | | |
|---|---|---|---|
| 1,740,165 | 12/1929 | Engelhardt | 204—130 |
| 2,273,797 | 2/1942 | Heise et al. | 204—98 |
| 3,103,473 | 9/1963 | Juda | 204—77 |
| 3,116,169 | 12/1963 | Thompson | 136—86 |
| 3,280,014 | 10/1966 | Kordesch et al. | 204—78 |

FOREIGN PATENTS 255,770  12/1960  Australia.

JOHN H. MACK, *Primary Examiner.*

H. M. FLOURNOY, *Assistant Examiner.*

U.S. Cl. X.R.

204—275, 130